United States Patent [19]

Hagedorn

[11] Patent Number: 4,914,690
[45] Date of Patent: Apr. 3, 1990

[54] UNIVERSAL PBX INTERFACE

[75] Inventor: Guenter E. Hagedorn, Minnetonka, Minn.

[73] Assignee: Nicollet Technologies, Inc., Eden Prairie, Minn.

[21] Appl. No.: 336,512

[22] Filed: Apr. 7, 1989

Related U.S. Application Data

[63] Continuation of Ser. No. 175,511, Mar. 31, 1988, abandoned.

[51] Int. Cl.⁴ ........................ H04M 3/50; H04M 7/14
[52] U.S. Cl. ...................................... 379/233; 379/88; 379/234; 379/281
[58] Field of Search ...................... 379/67, 88, 89, 231, 379/233, 234, 235, 240, 281

[56] References Cited

U.S. PATENT DOCUMENTS

| | | | |
|---|---|---|---|
| 4,076,965 | 2/1978 | Olsen et al. | 379/282 |
| 4,254,304 | 3/1981 | Fulghum et al. | 379/98 |
| 4,636,584 | 1/1987 | Binkerd et al. | 379/240 |
| 4,792,967 | 12/1988 | Ladd et al. | 379/67 |

FOREIGN PATENT DOCUMENTS

| | | | |
|---|---|---|---|
| 0154798 | 8/1985 | Japan | 379/281 |
| 0007761 | 1/1986 | Japan | 379/281 |
| 0236293 | 10/1986 | Japan | 379/234 |

OTHER PUBLICATIONS

"Patent covers PBX-integrated call routing", *Voice News*, 3/89.

*Primary Examiner*—Thomas W. Brown
*Attorney, Agent, or Firm*—Merchant, Gould, Smith, Edell, Welter & Schmidt

[57] ABSTRACT

A universal PBX-to-central office interface for standards conversion is described for supporting normally incompatible telephone equipment in PBX environments. The present invention is adapted for connection between the central office and a PBX along DID and DOD trunk lines. The present invention will capture incoming signaling and data in any one of three dialing modes (DTMF, MF and pulse dial) and convert this standard to whatever dialing mode is required by the equipment attached to the interface. The present invention will also do signaling conversion for peripheral equipment attached to PBX systems such as voice mail systems. The interface is capable of capturing extension signals transmitted from the central office to the PBX and saving them in memory for later downloading to a voice mail system to recover the extension of the dialed party after it has been forwarded to the voice mail system.

9 Claims, 7 Drawing Sheets

WINK PROTOCOL

UNIVERSAL PBX INTERFACE

This is a continuation of application Ser. No. 07/175,511, filed Mar. 31, 1988, abandoned.

FIELD OF THE INVENTION

The present invention relates to the field of PBX technology and in particular to PBX-to-central office interface systems for DID (direct inward dialing) and DOD (direct outward dialing) trunk lines to support signaling translation, voice mail systems and the like.

DESCRIPTION OF THE PRIOR ART

Three different signaling standards are available for use in PBX (private branch exchange) systems; dial pulse, DTMF (dual-tone multi-frequency) and MF (multi-frequency) signaling. A PBX user may subscribe to the telephone company and lease a number of DID (direct inward dialing) and DOD (direct outward dialing) lines for connection to a purchased or leased PBX system. The PBX system is generally tailored to recognize signaling with only one of the three available signaling modes. The leased lines must therefore be compatible with this mode of signaling (for example, DTMF, DID and DOD lines from DTMF signaling central office equipment compatible with a DTMF signaling PBX). It may be desirable, however, to connect an existing PBX system which recognizes one mode of signaling to a number of DID and DOD trunks which operate with another mode of signaling for reasons such as cost, availability, etc. In particular, a number of dial pulse PBX systems exist in older businesses which may, for various reasons, need to be connected to more modern DTMF signaling trunks. Another example may be the upgrading of portions of a PBX system using modern equipment which only uses DTMF signaling (such as voice mail systems) to older style PBX systems and DID/DOD lines, which only recognize dial pulse signaling. This type of incompatibility between the different modes of signaling prohibits many users from adapting different modes of equipment within the same system.

A further example of this incompatibility problem is voice mail systems adapted to PBX systems. Most voice mail systems available today operate with DTMF signaling. When connected to an older style PBX system which operates on dial pulse signaling or to a central office which uses MF (multi-frequency) signaling, the incompatibility of the signaling modes may render the system inoperative.

A further problem with voice mail systems and other telephone peripheral equipment adaptable to attachment to PBX systems is the identification of the telephone extension of the incoming call. In PBX environments, a common voice mail receiving station is typically connected to receive calls from the entire PBX system. In many applications, this connecting structure results in a bothersome problem for users of the voice mail answering service. This problem is caused by the manner in which the PBX system handles incoming calls. The central office downloads the extension of the called party on a DID trunk and the PBX system receives the extension number (transmitted using one of the three aforementioned dialing modes) to route the call. After the call has been routed to the appropriate extension, the extension telephone number of the incoming call is no longer needed and hence is lost. If, however, the called extension is busy or unavailable, the call is routed to the voice mail system. When the call is received by the voice mail system, the extension number originally dialed by the caller is no longer available and the voice mail service must ask the caller for the extension which was originally dialed so that the recorded message may be later forwarded to the correct extension. This is a troublesome problem in the application of voice mail systems to PBX systems.

SUMMARY OF THE INVENTION

The present invention solves the aforementioned problems and other problems that will be recognized by those skilled in the art upon reading and understanding the present specification. The present invention is directed toward a universal PBX-to-central office interface for standards conversion for supporting normally incompatible telephone equipment in PBX environments. For example, the present invention will adapt older style dial pulse PBX systems to more modern DTMF signaling DID and DOD trunks. The present invention will also capture incoming extension addresses on DID trunks transmitted in any dialing mode for later downloading to voice mail systems in whatever dialing mode is needed for reception. Those skilled in the art will readily recognize the many applications of the present invention for standards conversion in supporting of a wide variety of telephone equipment in PBX environments.

BRIEF DESCRIPTION OF THE DRAWINGS

In the drawings, where like numerals refer to like components throughout the several views.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the present invention may be practiced. This preferred embodiment is described in sufficient detail to enable those skilled in the art to practice the invention, and it is to be understood that other embodiments may be utilized and that structural or electrical changes may be made without departing from the spirit and scope of the present invention. The following detailed description is, therefore, not to be taken in a limiting sense, and the scope of the present invention is defined by appended claims.

The preferred embodiment of the present invention is an apparatus for connection between the DID or DOD trunk lines to the central office and a PBX system. This system is designed to operate as a standards conversion interface between the DID or DOD trunk lines (using either wink start or immediate start) and the PBX system. The present invention also supervises the line and stores the digits of the called extension on a DID trunk for later downloading to other telephone equipment attached to the PBX such as voice mail systems.

For the purpose of a better understanding of the present invention, a brief description of the handshake protocol typically used on DID and DOD lines is included here. PBX systems using DID and DOD trunk lines allow disproportionate ratios of the incoming and outgoing lines so that, for example, a business may handle a large number of incoming calls while only needing a small number of output lines to handle outgoing calls. Thus, for example, the business may have 100 DID lines and only 10 DOD lines. The DID lines are unassigned until an incoming call to the PBX is routed by the central office. One of the plurality of DID lines is selected by the central office and the call is routed to the PBX for final connection. The same system is used on DOD lines. The trunk signaling between the central office and the PBX on the DID and DOD lines most often used is loop reverse battery, more commonly called wink start protocol. A less common form of signaling is immediate start, in which the extension digits are downloaded at a specific time after the central office seizes the trunk.

Figure 8:
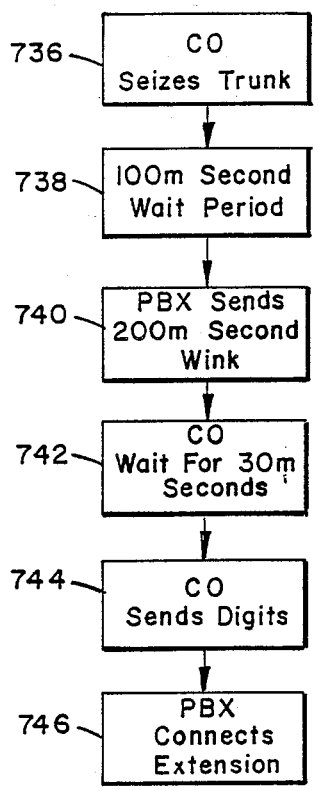
FIG. 8 shows prior art wink protocol.

Referring to FIG. 8, the prior art description of the wink start protocol is described for a DID trunk (identical to the protocol used on a DOD trunk). Central office seizes one of the DID trunk lines 736 by placing a DC load impedance across the trunk line. Since the PBX sources the talk battery voltage on a DID trunk (the central office sources talk battery on a DOD trunk), a current loop is created between the tip and ring wires of the trunk line. The current flowing through this loop is immediately sensed by the PBX. After an approximate 100 millisecond wait period 738, the PBX sends an approximate 200-millisecond wink 740 in the form of reversing the battery voltage between the tip and ring wires of the trunk line. This signals the central office that the PBX is ready to receive the in-house extension for the incoming call. After sensing the 200 millisecond wink, the central office waits for an additional 30 milliseconds after the wink has completed 742. The central office then sends the digits for the in-house extension 744 and the PBX connects the trunk line to the appropriate extension 746. This completes the call.

In the foregoing description of the wink start handshaking between the central office and the PBX, it can be seen that the extension of the called party is transmitted by the central office only once and the PBX connects the extension after receiving the digits. The vast majority of PBX's currently available on the market do not store the incoming digits, but rather use them directly to make the connection. The extension number of the party called is then immediately discarded by the PBX, since the design of these PBX's recognizes no further need to store these digits.

For a better understanding of the application of the present invention to peripheral telephone equipment such as voice mail systems, a brief description of the operation of a voice mail system in a PBX environment is described here. When an incoming call is directed by the PBX to an extension, the extension is either answered or directed to a voice mail system for automatic answering. When the call is directed to a voice mail system, the voice mail system is unaware of the extension number of the called party to which the DID trunk was connected. Thus, when the voice mail system is invoked, the voice mail device must query the caller as to the extension number of the called party. This is a cumbersome method of identifying the called party for the voice mail system, since all of the incoming calls to the voice mail system come from unknown sources.

Figure 1:
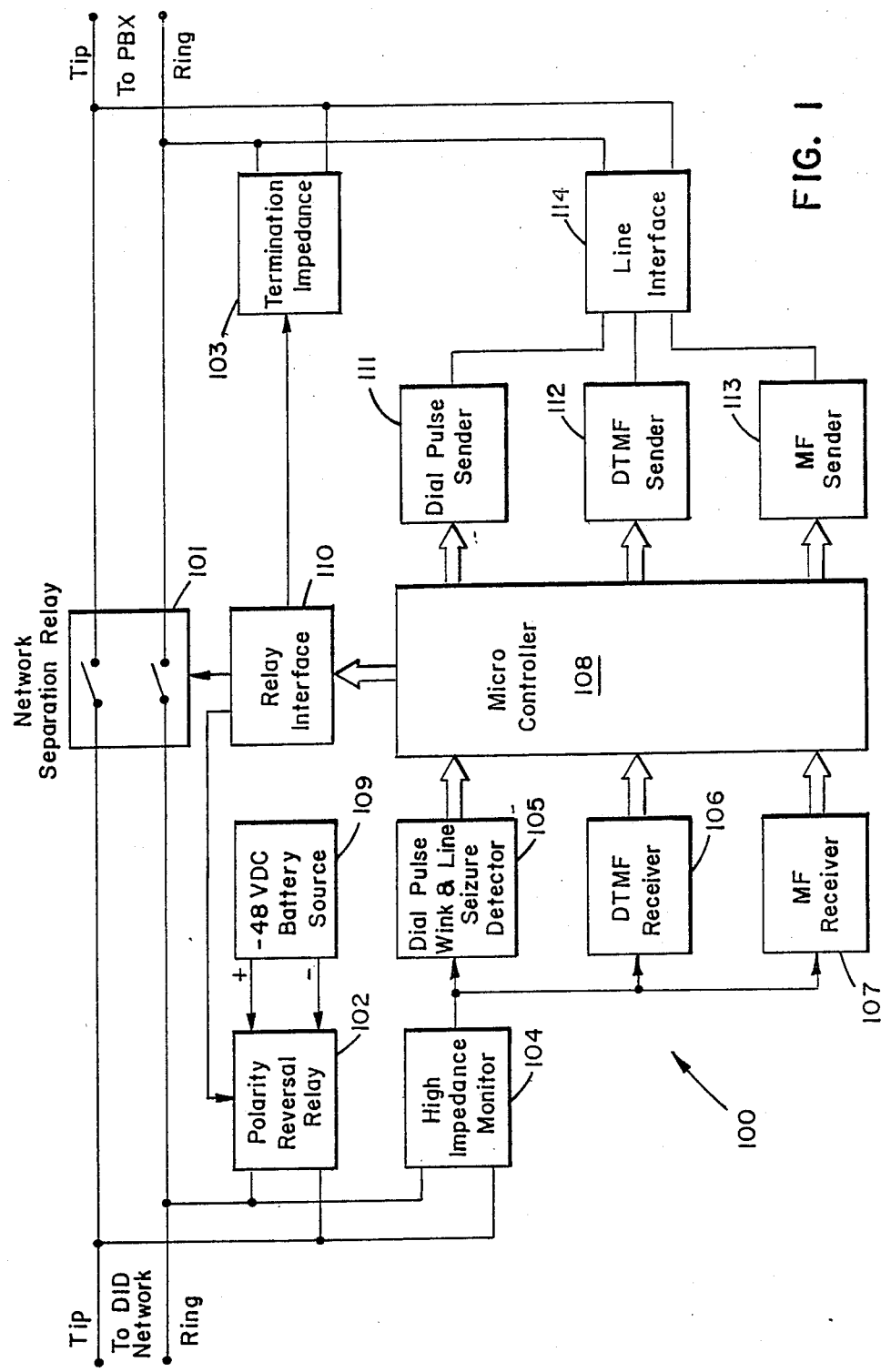
FIG. 1 is a block diagram of a universal DID-to-PBX interface.

Referring to FIG. 1, the preferred embodiment of the present invention is described. Reference number 100 generally refers to the universal PBX-to-central office interface. Although the preferred embodiment of the present invention is described in terms of a DID-to-PBX interface, those skilled in the art will readily recognize that the present invention is adaptable to performing the function of a PBX-to-DOD interface without any modifications. All handshaking and protocol dealing with a DOD connection from a PBX is identical to the handshake protocol described here. All that is required is that the interface be installed in the opposite direction than the DID installation direction. Thus it is manifestly intended that the present invention not be limited to inward dialing trunks only.

Network separation relay circuit 101 is shown as a simple relay connection between the DID network and the PBX. As will be shown in detail below, the operation and structure of the network separation relay circuit 101 is more complicated than is shown in FIG. 1. However, for purposes of this discussion it functionally operates as shown. The network separation relay circuit 101 serves to disconnect the DID network from the PBX during handshaking and signaling. After the appropriate connections between the central office and the called extension are established, the network separation relay will close to allow voice communication between the caller and the called party.

A relay interface 110 allows microcontroller 108 to control the relay control circuits of the network separation relay circuit 101, the polarity reversal relay circuit 102, the termination impedance circuit 103 and the line interface circuit 114. Each of the aforesaid circuits of FIG. 1 contain relay contacts which under microprocessor control will perform the functions of the interface 100.

Polarity reversal relay circuit 102 allows the interface 100 to send a polarity reversal wink to the DID line to inform the central office that the interface recognizes that the central office has seized the DID trunk and is requesting to send the digits of the dialed extension. The high impedance monitor circuit 104 serves to isolate the DID line from the receiver circuits 105, 106 and 107 of interface 100. The dial pulse wink and line seizure detector circuit 105 serves to receive dialed digits transmitted in the pulse dial mode. The detector circuit 105 also recognizes when the central office seizes the line and when the wink protocol has been properly invoked by the PBX.

The DTMF receiver 106 and MF receiver 107 serve to receive the transmitted digits of the dialed extension in either dual tone multi-frequency or multi-frequency modes, respectively. Circuits 105, 106 and 107 are connected to microcontroller circuit 108 and are controlled directly therefrom. The digits received from circuits 105, 106 or 107 are transmitted to microcontroller circuit 108 in the form of binary digits and are stored in internal memory of the microcontroller circuit 108. The binary digits of the dialed extension are then converted by circuits 111, 112 or 113 to the dialing standard used by the PBX or used by the telephone equipment peripherals attached to the PBX, such as voice mail systems (which almost exclusively use DTMF signaling). It is possible that the PBX and the telephone peripherals connected to the PBX operate on different dialing standards and hence microcontroller circuit 108 will transmit the information according to the standards recognized by the receiving device.

Dial pulse sender 111 will transmit the dialed digits to the PBX system or the telephone peripherals using the dial pulse standard if so required. The DTMF sender circuit 112 and the MF sender circuit 113 will likewise transmit the dialed digits in the form of either DTMF or MF tones. Line interface circuit 114 serves to allow circuits 111, 112 and 113 to transmit information codes onto the tip and ring wires of the PBX line through the appropriate impedance matching interface circuits. The line interface circuit 114 also contains relays controlled by the relay interface circuit 110 to connect or disconnect the line interface circuit during operation of interface 100.

When the network separation relay circuit 101 opens the line between the DID network and the PBX, polarity reversal relay circuit 102 allows the minus 48 volts DC talk battery voltage to be applied to the DID line so that the central office maintains the line active by keeping the line terminated. In a similar fashion, termination impedance circuit 103 must be kept across the tip and ring wires of the line to the PBX so that the PBX does not drop the line. Thus when network separation relay circuit 101 is open, the interface 100 appears to the central office to be a PBX sourcing battery voltage and the interface 100 appears to be a central office to the PBX by maintaining a termination impedance across the line. The microcontroller circuit 108 then operates the various associated circuits of interface 100 to perform the handshaking between the central office and the PBX so that, in effect, the central office sees the interface 100 as a PBX and the PBX sees the interface 100 as a central office.

The microcontroller circuit 108 of the present invention, along with the associated circuits shown in FIG. 1, is capable of supporting peripheral telephone equipment attached to the PBX, in addition to performing its interface functions. For example, one primary function that the interface 100 of the present invention is capable of performing is storing the digits of the dialed extension in the memory of the microcontroller circuit 108 for later re-transmitting or downloading to a voice mail system after the call has been routed from the dialed extension to the voice mail extension for answering. As was discussed above, when a call is routed from a dialed extension to the voice mail system, the voice mail system is unaware of the intended extension of the incoming call. Thus, if the voice mail system requests that the interface 100 re-transmit the digits of the dialed extension in DTMF mode, the voice mail system can recover the dialed extension without requesting that the caller provide this information.

Figure 2:
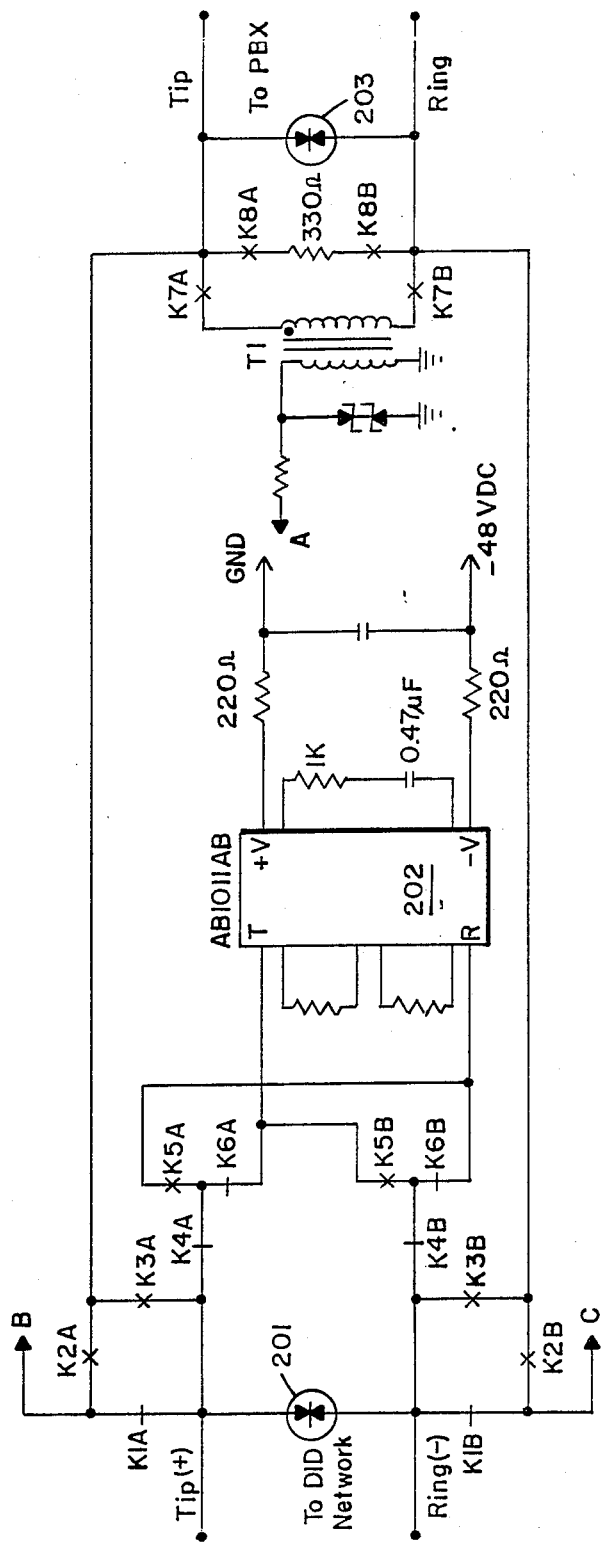
FIGS. 2 through 6 are detailed electrical schematic diagrams showing the specific implementation of the preferred embodiment of the universal PBX-to-central office interface.

FIG. 2 is a detailed electrical schematic diagram showing the implementation details of the network separation relay circuit 101, the polarity reversal relay circuit 102, the minus 48 volts DC battery voltage circuit 109, the termination impedance circuit 103 and the line interface circuit 114. Referring to FIG. 2, the tip and ring connections to the DID network of the central office and the tip and ring connections to the PBX are over-voltage protected by surge protectors 201 and 203, respectively. A plurality of relay contacts K1A–K6A and K1B–K6B are shown with the interface in an idle, active state. In other words, the relay contacts are positioned such that the interface is sourcing battery voltage to the tip and ring wires of the DID trunk in a ready-to-receive state while the connection to the PBX is held open, indicating no call in progress. Minus 48 VDC talk battery voltage is sourced through battery source chip 202 which in the preferred embodiment is part number LB1011AB, available from AT&T. This is a commonly available integrated circuit which is used in the telephone industry as an electronic battery feed circuit which supplies DC currents to a telephone line with minimal loading on the AC signals. This battery feed chip 202 is connected according to manufacturer's specifications and supplies a −48 VDC to the telephone line from a −54 VDC source. Those skilled in the art will readily recognize how to generate the appropriate the −54 VDC source. Those skilled in the art will also readily recognize that other techniques may be used for sourcing the −48 VDC talk battery to the telephone line in an equivalent fashion to the technique shown here.

The −48 VDC supply from battery source chip 202 is supplied to the ring connection through relay contacts K6B and K4B. The common return or ground path for the battery source voltage is through relay contacts K6A and K4A to the tip connection of the DID network line. The interface 100 receives information from the DID network by means of connections B and C which are shown to be connected to the appropriate signaling, transmitting and reception circuits found in FIGS. 3 through 6. In the present idle-ready state configuration of the relays of FIG. 2, the B and C connections monitor the tip and ring connections of the DID line through relay contacts K1A and K1B. Relay contacts K2A, K2B and K3A, K3B are shown open, indicating that the connection between the tip and ring lines of the DID trunk are open, or not connected, to the tip and ring lines of the PBX line.

Relay connections K1A, K1B and K2A, K2B are controlled such that their positions are always the opposite of one another. In other words, when relay contacts K1A, K1B are closed, relay contacts K2A and K2B are open. In this fashion, the monitor contacts B and C connected to the circuitry of FIGS. 3 through 6 are always connected to either monitor the tip and ring wires of the DID trunk or the tip and ring wires of the PBX line, but never both or neither. The details of the control of the K1 and K2 relay control circuits is described in conjunction with FIG. 6, below.

In a similar fashion, the relay contacts K6A, K6B and K5A, K5B are always positioned opposite one another. These relay contacts serve to create the reverse battery voltage condition or wink signal on the DID trunk. In the relay positions shown in FIG. 2, normal battery voltage polarity is sourced between the tip and ring wires of the DID trunk through normally closed relay contacts K6A and K6B. If, however, the interface 100 needs to create a wink signal on the DID trunk, relay contacts K5A and K5B will close simultaneous with the opening of relay contacts K6A and K6B. Thus, the polarity of the −48 VDC talk battery would be reversed when the relay contacts are reversed. The control circuit for relays K5 and K6 are discussed below in conjunction with FIG. 6.

After all signaling, monitoring and other supervising operations of the interface 100 have been completed, and the telephone call is cut through for voice communications, relay contacts K3A and K3B will close to directly connect the tip and ring lines of the DID trunk with the tip and ring lines of the PBX line and the PBX will assume supervision (such as sourcing the talk battery voltage).

Referring to the right of FIG. 2, relay contacts K8A and K8B serve to connect a 330 ohm termination impedance between the tip and ring wires of the PBX line. This termination impedance is necessary to indicate an incoming call, to hold the PBX line active while the connection between the DID trunk and the PBX is held open and to perform pulse dial signaling. The PBX line is held active with a 330 ohm impedance to make the interface appear to be the central office from the PBX frame of reference. In a similar fashion, the −48 VDC battery source supplied by the interface to the DID trunk makes the interface appear to be a PBX from the central office frame of reference.

Relay contacts K7A and K7B serve to connect the impedance matching transformer T1 to the tip and ring wires of the PBX line. Through this transformer T1, the DTMF and MF signaling and data can be transmitted to the PBX through connection point A. Connection point A is shown connected in FIG. 4. The primary of transformer T1 is over-voltage protected with Zener diodes to protect from back EMF. The secondary of transformer T1 is designed to present a 900 ohm impedance to the PBX line. Those skilled in the art will readily recognize that transformer T1 could optionally be designed to have a tap connected through a switch to one of the tip and ring leads so that the line matching impedance of transformer T1 could be field selectable to be, for example, 600 or 900 ohms matching impedance.

Figure 3:
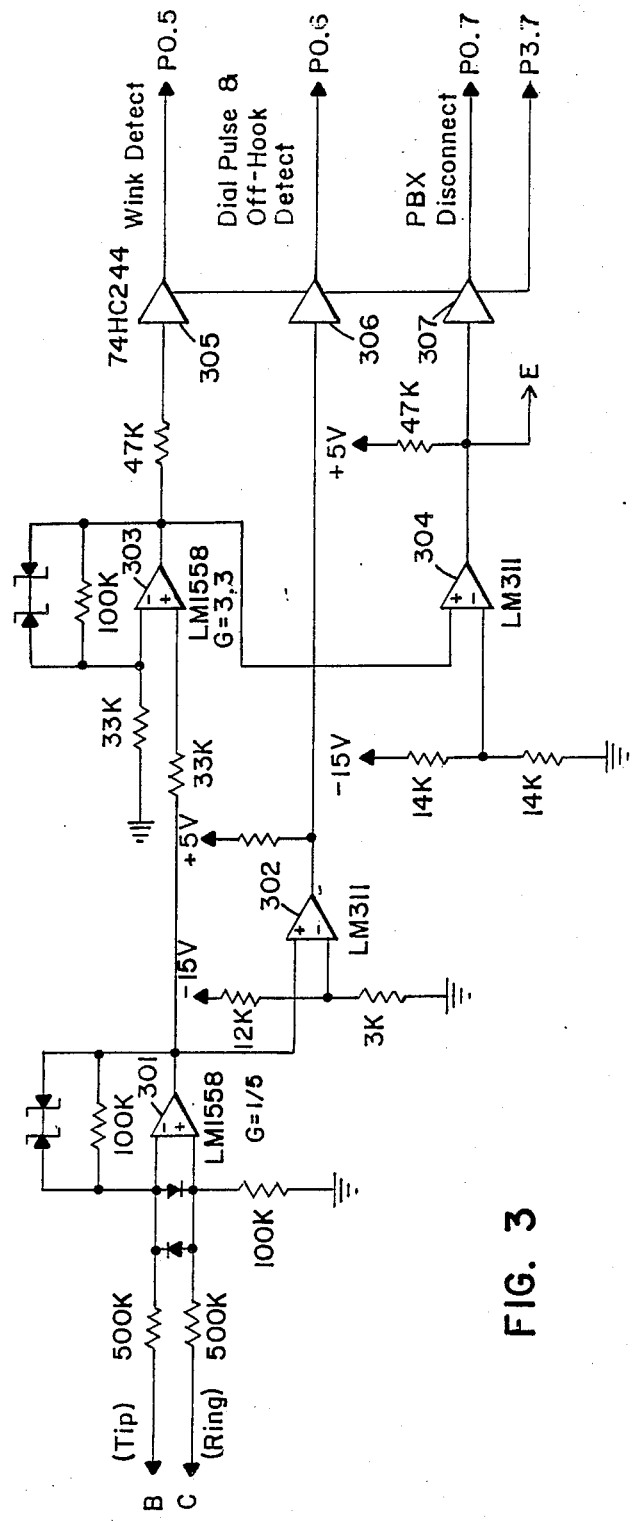

FIG. 3 shows detailed electrical schematic diagrams of a portion of the high impedance monitor circuit 104, and the dial pulse, wink and line seizure detect circuit 105. Operational amplifier 301 in the preferred embodiment is connected in differential mode operation with the inverting input connected to point B (tip) of FIG. 2 and with the non-inverting input connected to point C (ring) also of FIG. 2. The high input impedance of operational amplifier 301 serves to present a very high impedance to the tip and ring wires of the DID trunk. Operational amplifier 301 is in the preferred embodiment part number LM1558 available from National Semiconductor and other vendors. Zener diodes connected around operational amplifier 301 serve as overvoltage limiting. External resistors to operational amplifier 301 serve to select a gain at approximately one-fifth, thus attenuating the incoming signals.

The output of operational amplifier 301 is connected to the non-inverting input of operational amplifier 303. This amplifier is also in the preferred embodiment part number LM1558 available from National Semiconductor. Operational amplifier 303 is also overvoltage protected with Zener diodes. External resistors select a gain of this amplifier to be approximately 3.3. This amplifier is designed to detect voltage reversals on the tip and ring wires of the DID trunk to detect the wink signal. The output of operational amplifier 303 is buffered through a tri-state digital buffer 305 which in the preferred embodiment is part number 74HC244 available from Texas Instruments and other vendors. Buffers 305, 306 and 307 are found in the same package and thus the tri-state outputs are commonly connected to and controlled by port P3.7 to control the data from the aforesaid buffers to the I/O ports of microcontroller chip 501 of FIG. 5 (discussed below). Thus, the output of operational amplifier 303 buffered through the digital CMOS gate 305 creates a digital wink detect signal sensed by microcontroller chip 501 through port P0.5.

The output of operational amplifier 301 also drives the non-inverting input to comparator 302. Comparator 302 is in the preferred embodiment part number LM311 available from National Semiconductor and other vendors. This operational amplifier serves as a threshold detect with the inverting input connected to a voltage divider network to select the threshold of the comparitor 302. The output of comparator 302, pulled up by a pull up resistor, drives digital CMOS tri-state buffer 306 and serves to detect voltage thresholds between the tip and ring wires of the DID trunk to indicate dialed pulse signaling and off-hook conditions. This signal is input to port P0.6 on microcontroller chip 501 and indicates the status of the DID trunk.

The output of operational amplifier 303 also drives the non-inverting input of comparator 304 which in the preferred embodiment is also part number LM311 available from National Semiconductor. The inverting input of comparator 304 is connected to a voltage divider network to select the threshold of the comparitor 304. The output of comparator 304 is pulled up with a pull up resistor and drives digital CMOS tri-state buffer gate 307 to present the PBX disconnect signal to port P0.7 of microcontroller 501. All tri-state buffer gates 305, 306 and 307 of FIG. 3 are commonly controlled from port 3.7 so that the microcontroller 501 can activate these signals when the microcontroller pulls the status of the DID trunk. The output of comparator 304 also drives point E which connects to an optional status indicator shown in FIG. 6.

Figure 4:
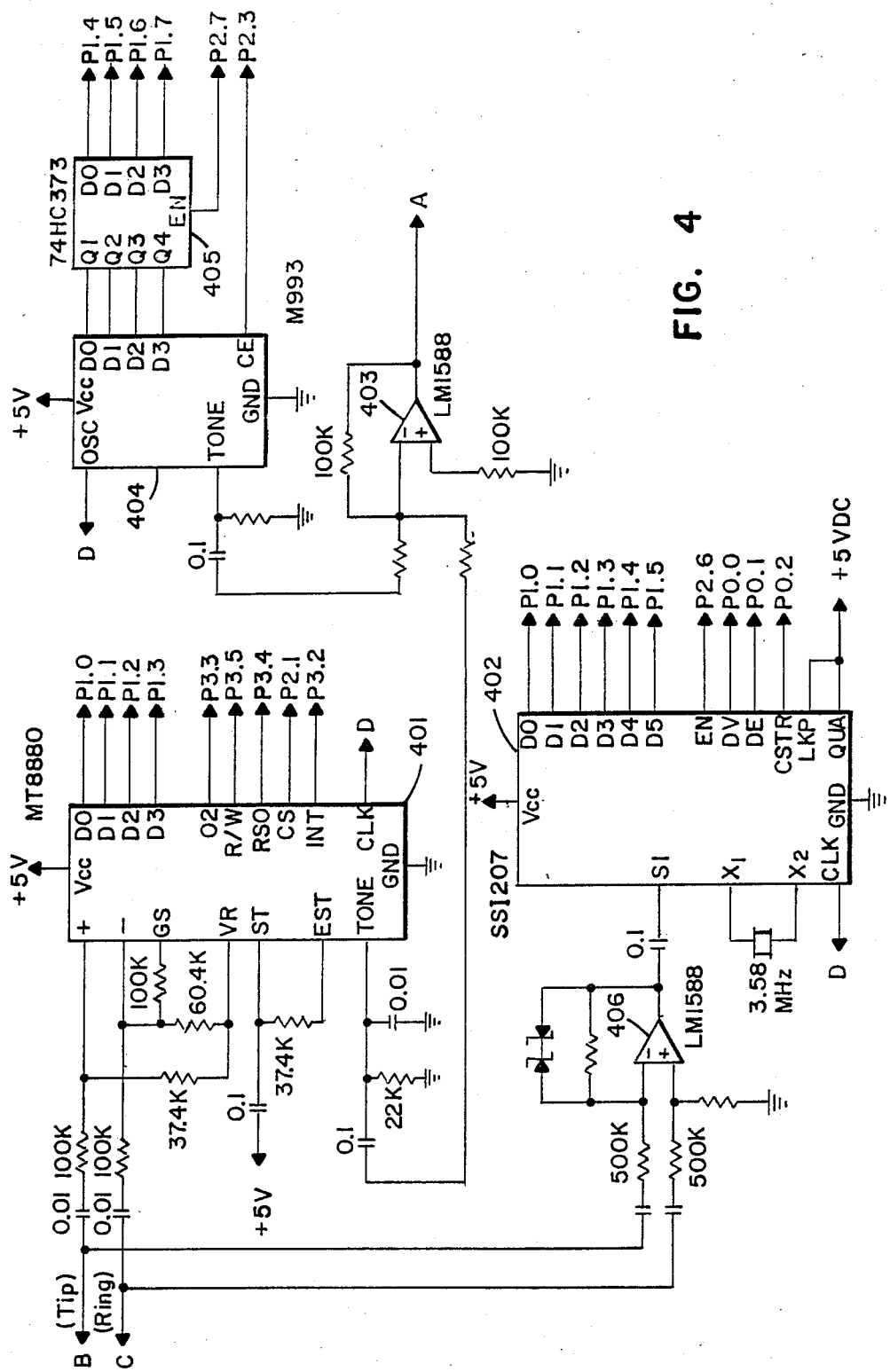

FIG. 4 shows the detailed electrical implementation of a portion of the high impedance monitor circuit 104, the DTMF receiver circuit 106, the DTMF sender circuit 112, the MF receiver circuit 107, the MF sender circuit 113 and a portion of line interface circuit 114. The DTMF receiver circuit 106 and the DTMF sender circuit 112 are commonly implemented in integrated circuit 401 which in the preferred embodiment is a DTMF transceiver part number MT8880 available from Mitel Corporation. This integrated circuit is shown capacitively coupled between points B (tip) and C (ring) of FIG. 2. DTMF transceiver 401 is connected according to manufacturer's specifications and serves to decode received DTMF signals into a four bit binary code presented on output data lines D0–D3. The DTMF transceiver 401 also serves to receive four bit binary codes on lines D0–D3 and produce the DTMF tones on the TONE output. Integrated circuit 401 is connected to microcontroller chip 501 of FIG. 5 to the appropriate I/O ports selected for data and control. Data lines D0–D3 are connected to ports P1.1–P1.3 with the control lines connected to ports P2.1, P3.2–P3.5. External capacitors and resistors are selected according to gain and frequency response characteristics as suggested by the manufacturer.

The output of DTMF transceiver chip 401 is capacitively coupled to a summing point connected to the inverting input of operational amplifier 403. This amplifier in the preferred embodiment is part number LM1558 available from National Semiconductor and other vendors. This amplifier serves primarily as a 1:1 gain buffer to sum the tone outputs of DTMF transceiver chip 401 and MF transmitter chip 404 (described below). The output of operational amplifier 403 drives point A of the line interface portion in FIG. 2. Thus, the tone outputs of DTMF transceiver chip 401 or MF transmitter chip 404 drive the PBX line.

Also connected between points B (tip) and C (ring) in FIG. 2 is operational amplifier 406 capacitively coupled and connected in differential mode. The gain of this operational amplifier is unity to buffer the incoming tone signals for MF receiver chip 402. Operational amplifier 406 is also over-voltage limited by Zener diodes.

MF receiver chip 402 in the preferred embodiment is part number SSI207 available from Silicon Systems, Inc. This commonly available MF transceiver chip is designed to decode multi-frequency tones into 4-bit binary codes. The binary codes corresponding to the decoded tones are placed on output lines D0-D5 and presented to I/O ports P1.0-P1.5, respectively, of microcontroller chip 501. As those skilled in the art will readily recognize, the data bus outputs of chips 401, 402 and 405 are tri-state controlled for time-multiplexed connection to the I/O ports of microcontroller chip 501. The microcontroller chip 501 uses control lines on the various chips to control the tri-state selection such that only one chip is driving the common I/O ports at a given time.

Control lines for MF receiver chip 402 are also connected to various I/O ports of microcontroller chip 501 as shown in FIG. 4. Unlike the shared data bus lines, the control lines for chips 401, 402, 404, 405, etc. must be attached to dedicated I/O ports, since the sharing of control lines is difficult to time multiplex and would require additional hardware.

DTMF transceiver chip 401, MF receiver chip 402 and MF transmitter chip 404 all operate from a 3.58 MHz crystal. The designers of these chips recognize that more than one of these chips may be connected in a single circuit and hence to save board space and cost, allow the chips to be daisy chained and controlled from a single crystal. Thus, chip 402 is shown connected to a 3.58 MHz (an inexpensive NTSC color subcarrier frequency crystal) and the CLK pins of chips 401, 402 and 404 are commonly connected through point D. Thus, all three of the aforementioned chips share this single 3.58 MHz crystal.

MF transmitter chip 404 receives four bit binary codes through data ports D0-D3 from the microcontroller chip to produce the multi-frequency tones out of the TONE line. The data lines are connected to ports P1.4-P1.7 of microcontroller chip 501 through a tri-state buffer chip 405. This chip in the preferred embodiment is part number 74HC373, a CMOS tri-state latch circuit available from Texas Instruments and other vendors. The clocking and enable line of chip 405 is connected to port P2.7 and the chip select or chip enable line of MF transmitter 404 is connected to microcontroller port P2.3. The output of MF transmitter chip 404 is capacitively coupled to the summing point connected to the inverting input of operational amplifier 403. This summing point sums the tone outputs of DTMF transmitter chip 401 and MF transmitter chip 404 for transmitting the tone codes to the PBX system.

Figure 5:
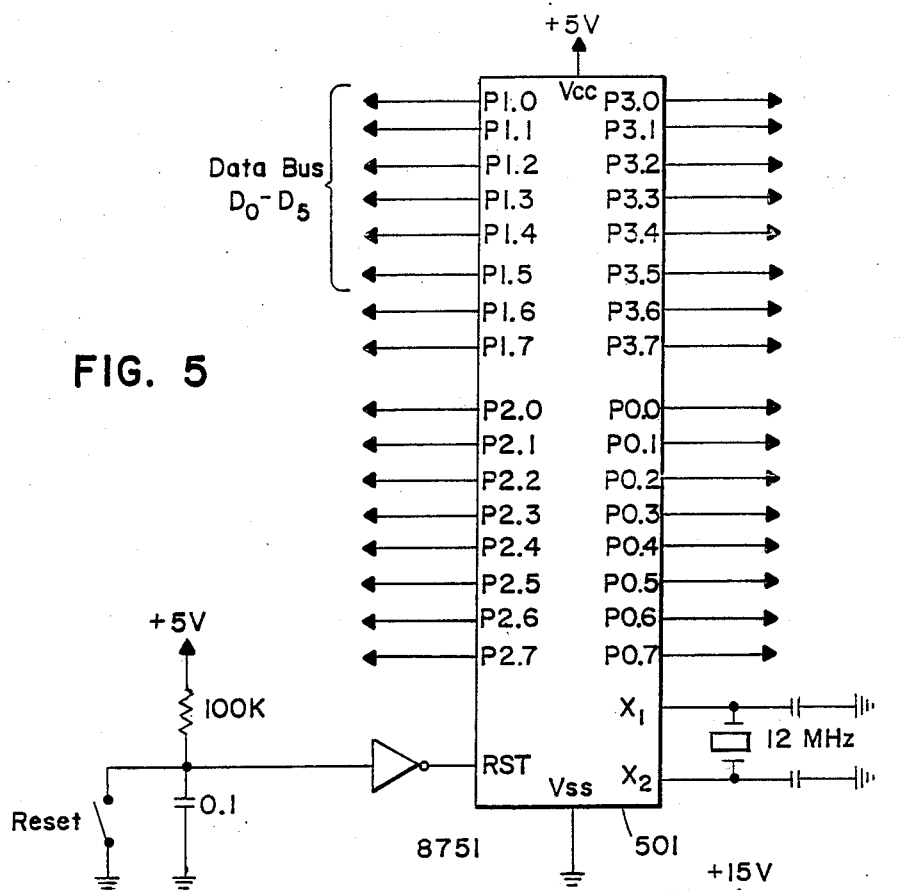

FIG. 5 shows the microcontroller chip 501 used in the preferred embodiment of the present invention. This chip is an Intel 8751 single chip 8 bit microcomputer with on-board EPROM memory and RAM scratch pad memory. The architecture of this microcontroller includes four 7 bit I/O ports which are wired in the preferred embodiment to control the operation of the interface 100. In the preferred embodiment of the present invention shown, many of the ports can perform dual functions by time multiplexing the operation of the ports, as in the technique described above for the tri-state data bus. For example, ports P1.0-P1.7 could be time multiplexed to be connected to a plurality of DIP switches using tri-state controllers and programming the microcontroller chip 501 to read the DIP switch positions using a single dedicated I/O port for tri-state control. In this fashion, the interface 100 may be field programmable to control optional operational functions of the interface such as wink start or immediate start, the number of extension digits transmitted, pulse, DTMF or MF operation of the CO, pulse DTMF or MF operation of the PBX, etc.

Those skilled in art will readily recognize that the preferred embodiment of the present invention may utilize a wide variety of alternate control structures without departing from the scope and spirit of the present invention. For example, a wide variety of microcontrollers or microprocessors, whether they be single chip or multi chip implementations, may be substituted for the microcontroller chip of the preferred embodiment. In a like fashion, hard-wired control or microprogram control could be substituted. In addition to this, the control functions of the present invention could be implemented by ROM-based control or PLA-base control or other software or hardware control structures.

Figure 6:
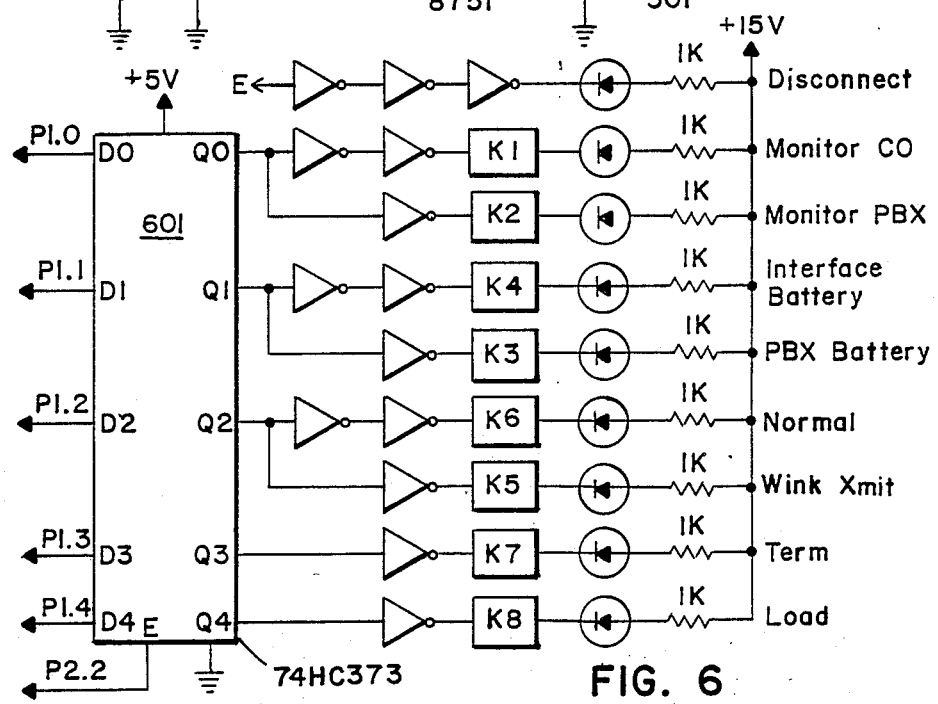

The microcontroller chip 501 indirectly controls the control circuits of relays K1-K8 of the preferred embodiment of the present invention. The relays used in the present invention are solid state relays with optically isolated control lines and in the preferred embodiment are part number LH1065 available from AT&T and commonly used in the telephone industry. These solid state relays offer nearly zero cross-talk between the control lines and the relay contacts while offering very low contact impedance. Those skilled in the art will readily recognize that electro-mechanical and other types of relays could be used throughout the present invention. The relays chosen in the preferred embodiment of the present invention are designed to handle an extremely high number of closings without degradation in performance. The solid state relay control circuits K1-K8 shown in FIG. 6 are the equivalent of the relay coils in electro-mechanical relays. For example, relay control circuit K1 controls relay contacts K1A and K1B of FIG. 2. Each relay control circuit is wired in series with a current limiting resistor and an optional LED indicator. These indicators can be mounted on the front panel of the interface 100 to indicate the status of the interface.

The relay control circuits are controlled from the microcontroller ports P1.0-P1.4, the signals of which are buffered through an octal D-type latch integrated circuit 601 which in the preferred embodiment is part number 74HC373 available from Texas Instruments and other vendors. Each latch within integrated circuit 601 is commonly controlled from the enable line attached to a dedicated control port P2.2. The outputs of the latch circuits 601 are used to indirectly control the relay control circuits K1-K8 through digital inverting buffers. These inverting buffer circuits are used to obtain the correct logic level for driving the relay control circuits.

As was described above, the relay contact points for relay K1 are designed to operate the opposite of the relay contacts of K2. Thus, when the relay contacts K1A and K1B are closed, the relay contacts for K2A and K2B are open. Relay K1 in its normally closed position indicates that the interface is monitoring the central office from the DID trunk. When the relay contacts for normally open relay K2 are closed, the interface is monitoring the line from the PBX. Thus, the configuration of the inverting buffers connected to the Q0 output of D-type latch chip 601 indicates that the relay control circuits K1 ad K2 operate mutually exclusive of one another.

In a like fashion, relay control circuits K3 and K4 operate mutually exclusive of one another. Thus, when the normally closed relay contacts K4A and K4B are closed, the DID trunk to the central office has the talk battery sourced from the interface. When the normally open relay contacts K3A and K3B are closed, the talk battery voltage on the DID trunk is sourced from the PBX (and the PBX is connected to the trunk). Once again, optional LED indicators are attached in series with the K3, K4 relay control circuits to indicate their position.

Relay contacts K6A, K6B also operate mutually exclusive of relay contacts K5A, K5B. These relay contacts indicate the polarity of the −48 VDC battery voltage source to the DID trunk. When relay control circuit K6 is in its normally closed position, the normal polarity of the −48 VDC battery voltage is applied to the DID trunk. When the normally open relay control circuit K5 is closed, the polarity of the battery voltage applied to the DID trunk is reversed in the form of a wink transmit signal. Optional LED indicators are also wired in series with the K6 and K5 control circuits to indicate status.

Relay control circuit K8 controls the 330 ohm DC termination placed between the tip and ring wires of the PBX line. Relay control circuit K8 is normally open, but when closed places the termination across the line. Relay K8 can be rapidly opened and closed to perform pulse dialing. Relay control circuit K7 serves to connect the impedance matching transformer T1 between the tip and ring wires of the PBX line. When the normally open relay contacts K7A, K7B are closed, the interface can transmit tone signals to the PBX.

Figure 7:
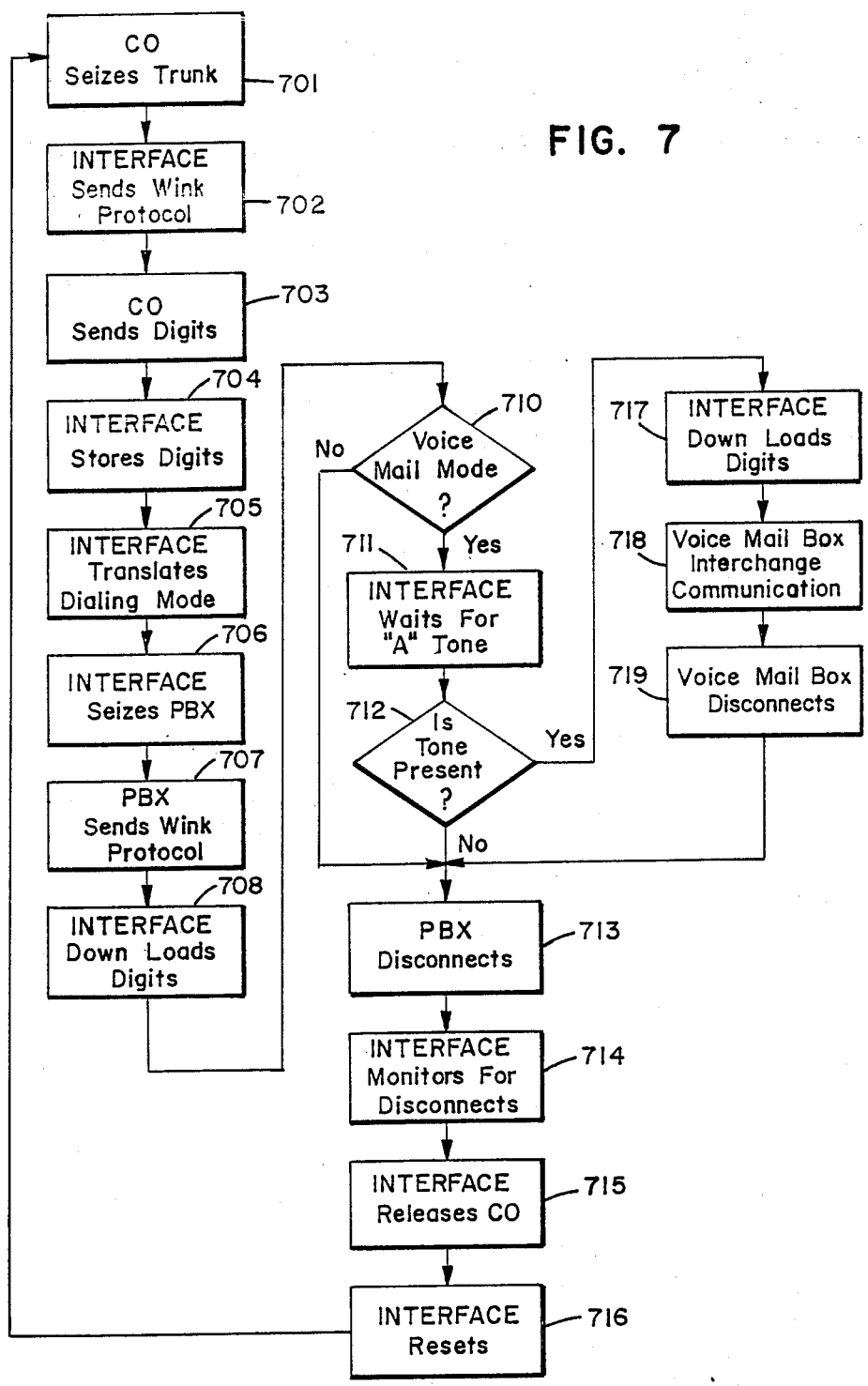
FIG. 7 is an operation flow chart for programming the microcontroller for the universal DID-to-PBX interface.

FIG. 7 is a high-level control flow chart of the software control program sequence contained in the EPROM program memory of microcontroller chip 501 for the interface 100. Those skilled in the art will readily recognize the translation of this control sequence into the appropriate microprocessor control commands necessary to operate the interface 100.

Beginning at command box 701, the central office seizes the trunk by placing a termination impedance across the DID trunk, indicating that a call is to be forwarded to the PBX. At command box 702, the interface detects the current through the tip and ring wires caused by the termination impedance and sends loop reverse-battery-wink signal to the central office, indicating that the interface is ready to receive the extension of the called party. This wink protocol used by the interface is identical to the wink protocol used by a PBX, thus the central office recognizes this protocol as though it were attached to a PBX system. The central office will detect the wink and after an approximate 30 millisecond wait period after termination of the wink, the central office sends the digits corresponding to the extension of the dialed party down the DID trunk, as shown in command box 704. The interface system receives these digits (in either dial pulse, DTMF or MF mode), translates the digits into binary and stores the digits in the microcontroller memory, as shown in command box 705. After the microcontroller receives and stores the extension of the called party, the interface seizes the PBX line by placing a termination impedance between the tip and ring wires. PBX recognizes the current through the loop caused by the termination impedance and sends a loop reverse-battery-wink as though it were handshaking with the central office, as shown in command box 707. The interface recognizes this handshake protocol and operates as a central office by transmitting the digits of the dialed extension in the mode recognized by the PBX (dial pulse, DTMF or MF), as shown in command box 708.

If the present invention is operating in a special mode to support telephone equipment peripherals of the PBX, such as a voice mail system, the control flow would be a bit different at this point. For example, if the present invention was operating to support a voice mail system, as shown in command box 710, control flow would pass to box 711 where the interface would wait for a request from the voice mail system to download the digits a second time. For example, at command box 711, the DTMF "A" tone could be used to indicate a request to send from the voice mail system. The "A" through "D" tones of the DTMF repetoire are not used by the central office switching equipment and thus would not interfere with any ongoing controller signaling. If the request to send tone were transmitted by the voice mail system, decision box 712 would pass control to command box 717 where the interface would once again download the digits in DTMF of the dialed extension to inform the interface the identity of the called party to which the trunk was attempting to connect.

The detailed sequence of control commands to open and close the relays of the interface to download the digits in command box 717 are similar to the detailed sequence of events to download the digits in command box 708. To download the digits, relays K4 and K6 close their respective contact points to source −48 VDC talk battery voltage to the DID trunk, simultaneous with the closing of the contacts associated with relay control circuits K7 and K8 to place a termination resistance between the tip and ring lines of the PBX line and attach the impedance matching transformer T1 to the PBX line to transmit data. Along with the aforementioned relay closings and openings, the DID trunk line is disconnected from the PBX line by the opening of the K1 relay contacts and K3 relay contacts. The interface is now positioned to transmit the extension of the called party to the voice mail system.

The voice mail box receives the digits of the dialed extension in command box 717 of FIG. 7 and may optionally transmit an acknowledgement tone back to the interface when the digits have been properly received. Since the relay contacts associated with relay control circuit K2 are closed so that the interface may monitor the line from the PBX, the interface will receive the optional acknowledgement signal from the voice mail box and cut through the telephone line between the central office and the PBX for talking by (1) removing the interface battery voltage, (2) removing the line termination impedance, (3) removing the impedance matching transformer T1 for the transmit interface, and (4) closing relay contacts K3A, K3B to cut through for talking the DID trunk to the PBX line.

Voice communication is then carried on between the caller and the voice mail system until the voice mail box disconnects at command box 719 in FIG. 7. The control flow at this point merges with the control flow from decision box 712 and decision box 710 at command box 713. The PBX will then disconnect from the central office when either party disconnects the call (whether it be the voice mail system, the caller or the called party). The interface monitors the line for the disconnect at command box 714 and the interface releases the central office by putting the relays back into their idle position, in the positions shown in FIG. 2. In this position, the interface sources talk battery to the central office and an open line is maintained to the PBX. At command box 716, the interface resets its internal memory and transfers control of the control program back to command box 701 to monitor for the central office seizing the trunk once again.

While the present invention has been described in connection with the preferred embodiment thereof, it will be understood that many modifications will be readily apparent to those of ordinary skill in the art, and this application is intended to cover any adaptations or variations thereof. Therefore, it is manifestly intended that this invention be limited only by the claims and equivalents thereof.

What is claimed is:

1. A central office-to-PBX standards conversion interface, comprising:
    first connection means for connecting to a telephone line from the central office;
    second connection means for connecting to a telephone line from the PBX;
    separation relay means connected between said first connection means and said second connection means for selectively connecting and disconnecting the telephone line from the central office and the telephone line from the PBX;
    a talk battery source selectively connected to said first connection means;
    a termination impedance selectively connected to said second connection means;
    first conversion means connected to said first connection means for converting dialing codes of a first mode received from the central office into binary digits;
    second conversion means connected to said second connection means for converting binary digits into dialing codes of a second mode for transmission to the PBX;
    control means, having memory, connected to said separation relay means, said talk battery source, said termination impedance, said first conversion means and said second conversion means for converting the dialing codes of said first mode into dialing codes of said second mode and for storing said dialing codes in said memory; and
    said control means also for communicating with the central office and the PBX to handle signalling and handshaking when said separation relay means has disconnected the telephone line from the central office and the telephone line from the PBX.

2. The interface of claim 1 wherein said first mode is one of DTMF (dual tone multi-frequency) dialing mode, MF (multi-frequency) dialing mode, and pulse dialing mode.

3. The interface of claim 1 wherein said second mode is one of DTMF (dual tone multi-frequency) dialing mode, MF (multi-frequency) dialing mode, and pulse dialing mode.

4. The device according to claim 1 wherein said control means performs the steps of:
    (a) disconnecting the telephone line from the central office from the telephone line from the PBX;
    (b) connecting said talk battery source to said first connection means;
    (c) receiving the dialing codes in said first mode from the telephone line from the central office;
    (d) converting the dialing codes into binary digits;
    (e) storing the binary digits representative of the dialing codes into said memory;
    (f) connecting said termination impedance to said second connection means;
    (g) converting the binary digits stored in memory into dialing codes of said second mode;
    (h) transmitting the dialing codes in said second mode; and
    (i) disconnecting said talk battery source and said termination impedance from said first and second connection means, respectively, simultaneous with connecting the central office and the PBX telephone lines through said separation relay means.

5. The interface according to claim 1 wherein said control means is further operable for retransmitting the dialing codes upon request from a PBX peripheral device.

6. A central office-to-PBX standards conversion interface, comprising:
    central office connection means for electrically attaching to a first telephone line;
    PBX connection means for electrically attaching to a second telephone line;
    network separation relay means attached between said central office connection means and said PBX connection means for selectively electrically connecting and disconnecting said first telephone line and said second telephone line;
    talk battery source means selectively electrically connected through a polarity reversal relay to said central office connection means for selectively sourcing talk battery voltage to the first telephone line and for selectively reversing the polarity of said talk battery voltage;
    termination means selectively electrically connected to said PBX connection means for selectively placing a termination impedance across the second telephone line;
    first conversion means selectively electrically connected to said central office connection means and said PBX connection means for receiving dialing codes in one of a plurality of transmission modes and for converting said dialing codes into binary digits;
    second conversion means selectively electrically connected to said PBX connection means for converting said binary digits into dialing codes of one of said plurality of transmission modes and for transmitting said dialing codes to said second telephone line;
    control means, having memory, connected for controlling said network separation relay means, said talk battery source means, said polarity reversal relay, said termination means, said first conversion means, and said second conversion means, and for performing the steps of:
    (a) disconnecting said first telephone line from said second telephone line;
    (b) connecting said talk battery source to said central office connection means and sourcing talk battery voltage to the first telephone line;

(c) sensing a request to transmit dialing codes from said first telephone line by means of sensing a current loop through the first telephone line;

(d) optionally reversing the polarity of the talk battery voltage from the talk battery source means on said first telephone line;

(e) receiving dialing codes in one of said plurality of transmission modes from the first telephone line;

(f) converting said dialing codes into binary digits;

(g) storing said binary digits in the memory of said control means;

(h) electrically connecting said termination impedance to said second telephone line;

(i) converting said binary digits into one of said plurality of transmission modes;

(j) transmitting said dialing codes to the second telephone line; and (k) electrically connecting said first telephone line and said second telephone line.

7. The interface according to claim 6, further including the steps of:

(l) electrically connecting said first conversion means to said PBX connection means;

(m) receiving a request to send in the form of a dialing code;

(n) electrically connecting said talk battery source means to said central office connection means for sourcing talk battery voltage to said first telephone line and electrically connecting said termination means to said PBX connection means for terminating said second telephone line simultaneous with electrically disconnecting the central office connection means from the PBX connection means;

(o) reconverting the binary digits stored in memory into one of said plurality of dialing modes;

(p) retransmitting said dialing codes to said second telephone line; and (q) electrically disconnecting said talk battery source means from said central office connection means and electrically disconnecting said termination impedance means from said PBX connection means simultaneous with electrically connecting said central office connection means to said PBX connection means.

8. The device according to claim 6, wherein said central office connection means is electrically attached to a telephone line from the PBX and wherein said PBX connection means is electrically attached to a trunk telephone line from the central office.

9. The device according to claim 6, wherein said central office connection means is electrically attached to a telephone line from the central office and wherein said PBX connection means is electrically attached to a trunk telephone line from the PBX.

* * * * *